United States Patent
Uriu et al.

(10) Patent No.: US 7,027,777 B2
(45) Date of Patent: Apr. 11, 2006

(54) HIGH FREQUENCY SWITCH AND HIGH FREQUENCY RADIO COMMUNICATION APPARATUS

(75) Inventors: Kazuhide Uriu, Katano (JP); Toshio Ishizaki, Kobe (JP); Hideaki Nakakubo, Kyoto (JP); Toru Yamada, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 541 days.

(21) Appl. No.: 10/282,415

(22) Filed: Oct. 29, 2002

(65) Prior Publication Data
US 2003/0092398 A1  May 15, 2003

(30) Foreign Application Priority Data
Oct. 30, 2001 (JP) ............................... 2001-332192

(51) Int. Cl.
*H04B 1/44* (2006.01)
(52) U.S. Cl. ............................. 455/78; 455/82; 455/83; 455/188.1
(58) Field of Classification Search ............. 455/188.1, 455/83, 78, 130, 552.1, 82, 327, 73, 79, 80; 333/103; 342/70, 128
See application file for complete search history.

(56) References Cited

U.S. PATENT DOCUMENTS

| | | | |
|---|---|---|---|
| 6,087,980 A * | 7/2000 | Saryo ......................... 342/128 |
| 6,442,376 B1 | 8/2002 | Furutani et al. |
| 6,542,722 B1 * | 4/2003 | Sorrells et al. ............. 455/110 |
| 2002/0183016 A1 * | 12/2002 | Kemmochi et al. ........... 455/83 |
| 2003/0171098 A1 * | 9/2003 | Tai et al. ....................... 455/78 |
| 2003/0181174 A1 * | 9/2003 | Takagi ......................... 455/130 |
| 2004/0246168 A1 * | 12/2004 | Isaji ............................ 342/70 |
| 2004/0266378 A1 * | 12/2004 | Fukamachi et al. ....... 455/188.1 |
| 2005/0116855 A1 * | 6/2005 | Toennesen et al. ........... 342/70 |

FOREIGN PATENT DOCUMENTS

JP  2000-165274  6/2000

* cited by examiner

*Primary Examiner*—Curtis Kuntz
*Assistant Examiner*—Tuan H. Nguyen
(74) *Attorney, Agent, or Firm*—RatnerPrestia

(57) ABSTRACT

A high frequency switch having a plurality of signal paths for four frequency bands, the high frequency switch, has
  branching means,
  first and second transmission reception changeover means connected to the branching means, and
  a plurality of filters placed in the plurality of signal paths,
  the first transmission reception changeover means has a first common transmitting end for transmission signals of the first frequency band and the second frequency band, a first receiving end for a reception signal of the first frequency band, and a second receiving end for a reception signal of the second frequency band, and
  the second transmission reception changeover means has a second common transmitting end for transmission signals of the third frequency band and the fourth frequency band, a third receiving end for a reception signal of the third frequency band, and a fourth receiving end for a reception signal of the fourth frequency band.

22 Claims, 9 Drawing Sheets

50

(a)

(b)

HIGH FREQUENCY SWITCH AND HIGH FREQUENCY RADIO COMMUNICATION APPARATUS

BACKGROUND OF THE INVENTION

1. Field of the Invention

The present invention relates to a high frequency switch and a high frequency radio communication apparatus that are used for a mobile phone and the like, and, more particularly, to a high frequency switch and a high frequency radio communication apparatus that are used in four different systems.

2. Description of the Related Art

In recent years, in view of the increasing number of users of mobile communication and globalization of the systems, for example, mobile phones for four bands have been studied. Such mobile phones use four different systems of AMPS (Advanced Mobile Phone Service), EGSM (Enhanced-Global System for Mobile Communications), DCS (Digital Cellular System), and PCS (Personal Communications Services) in a single mobile phone. These systems have corresponding frequency bands of FIG. 9. Thus, high frequency switches used for such mobile phones have received attention. FIG. 9 is an explanatory drawing showing the corresponding frequencies of EGSM, AMPS, DCS, and PCS.

Here, referring to FIG. 8, which is a block diagram showing a conventional high frequency switch, the following will discuss the configuration and operation of the conventional high frequency switch used for mobile phones and so on. The conventional high frequency switch is provided for dual bands (the above-mentioned EGSM and DCS) that comprises transmission reception changeover circuits 71 and 72 and a branching filter circuit 73 of connecting the transmission reception changeover circuits 71 and 72 to an antenna (ANT). The transmission reception changeover circuit 71 has a transmitting terminal Tx1 for EGSM transmission and a receiving terminal Rx1 for EGSM reception, and the transmission reception changeover circuit 72 has a transmitting terminal Tx2 for DCS transmission and a receiving terminal Rx2 for DCS reception.

Besides, the above explanation discussed the frequency switch for dual bands as an example. High frequency switches for triple bands are also available (see U.S. Pat. No. 6,442,376).

In the future, it is expected that complexity will further increase due to multi-band configurations for four bands and so on (e.g., EGSM/AMPS/DCS/PCS). In this case, problems such as a larger circuit size arise.

SUMMARY OF THE INVENTION

The present invention is devised in view of the above-described problem and has as its object the provision of a small high frequency switch for a multi-band configuration and a high-frequency radio communication apparatus.

The present invention makes it possible to provide a small high frequency switch for multiple bands and a high-frequency radio communication apparatus.

The 1st invention of the present invention is a high frequency switch having a plurality of signal paths for four frequency bands, the high frequency switch, comprising:

branching means of branching a transmission signal and a reception signal of the four frequency bands according to a frequency, first and second transmission reception changeover means of performing switching to any one of the plurality of signal paths, and a plurality of filters placed in the plurality of signal paths, wherein the first and second transmission reception changeover means are connected to the branching means, the first transmission reception changeover means has a one-input three-output port configuration in which a first common transmitting end for transmission signals of the first frequency band and the second frequency band, a first receiving end for a reception signal of the first frequency band, and a second receiving end for a reception signal of the second frequency band are connected as switching targets, and the second transmission reception changeover means has a one-input three-output port configuration in which a second common transmitting end for transmission signals of the third frequency band and the fourth frequency band, a third receiving end for a reception signal of the third frequency band, and a fourth receiving end for a reception signal of the fourth frequency band are connected as switching targets.

The 2nd invention of the present invention is the high frequency switch according to the 1st invention, further comprising a plurality of control power supplies of switching on/off of a plurality of diodes of the first and second transmission reception changeover means, wherein the first common transmitting end on the first transmission reception changeover means and the fourth receiving end on the second transmission reception changeover means are controlled by a first common control power supply.

The 3rd invention of the present invention is the high frequency switch according to the 2nd invention, further comprising a plurality of control power supplies of switching on/off of a plurality of diodes of the first and second transmission reception changeover means, wherein the second receiving end on the first transmission reception changeover means and the second common receiving end on the second transmission reception changeover means are controlled by a second common control power supply.

The 4th invention of the present invention is the high frequency switch according to the 3rd invention, wherein the first transmission reception changeover means includes a first diode having an anode connected to the first common transmitting end and a cathode connected to the branching means, the second transmission reception changeover means includes a second diode having an anode connected to the fourth receiving end and a cathode connected to the branching means, a first inductor is connected to the anode of the first diode and a second inductor is connected to the anode of the second diode, and the first and second inductors are grounded via a first capacitor and are connected to a first common control terminal for the first common control power supply.

The 5th invention of the present invention is the high frequency switch according to the 4th invention, wherein the second transmission reception changeover means includes a third diode having an anode connected to the second common transmitting end and a cathode connected to the branching means, the first transmission reception changeover means includes a fourth diode having an anode connected to the second receiving end and a cathode connected to the branching means, a third inductor is connected to the anode of the third diode and a fourth inductor is connected to the anode of the fourth diode, and the third and fourth inductors are grounded via a second capacitor and are connected to a second common control terminal for the second common control power supply.

The 6th invention of the present invention is the high frequency switch according to the 5th invention, wherein a plurality of strip lines and a plurality of capacitors are formed as electrode patterns on a plurality of dielectric layers, the strip lines and capacitors constituting the first and second transmission reception changeover means, the plurality of filters, and the branching means, via hole conductors are formed between the dielectric layers to form the plurality of strip lines and the plurality of capacitors, and at least one of a diode, capacitor, resistor, and inductor constituting the first and second transmission reception changeover means, the plurality of filters, and the branching means is placed on a layered body formed by laminating the dielectric layers.

The 7th invention of the present invention is the high frequency switch according to the 6th invention, wherein a first ground electrode pattern is placed in the layered body, the first inductor is constituted by a first strip line, and the second inductor is constituted by a second strip line, and the first ground electrode pattern is placed so that the first strip line and the second strip line sandwich the first ground electrode pattern along a laminating direction of the layered body.

The 8th invention of the present invention is the high frequency switch according to the 7th invention, wherein a second ground electrode pattern is placed in the layered body, the third inductor is constituted by a third stripline, and the fourth inductor is constituted by a fourth strip line, and the second ground electrode pattern is placed so that the third strip line and the fourth strip line sandwich the second ground electrode pattern along the laminating direction of the layered body.

The 9th invention of the present invention is the high frequency switch according to the 8th invention, wherein the first ground electrode pattern and the second ground electrode pattern placed in the layered body are identical.

The 10th invention of the present invention is the high frequency switch according to the 6th invention, wherein a first strip line constituting the first inductor and a second strip line constituting the second inductor are placed so as not to overlap each other along the laminating direction.

The 11th invention of the present invention is the high frequency switch according to the 6th invention, wherein a third strip line constituting the third inductor and a fourth strip line constituting the fourth inductor are placed so as not to overlap each other along the laminating direction.

The 12th invention of the present invention is the high frequency switch according to the 8th invention, wherein the first strip line, the second strip line, the third strip line, and the fourth strip line are smaller in electrode width than strip lines other than the first strip line, the second strip line, the third strip line, and the fourth strip line.

The 13th invention of the present invention is the high frequency switch according to the 7th invention, wherein a bottom of the layered body comprises:

a first transmitting terminal electrode connected to the first common transmitting end, a second transmitting terminal electrode connected to the second common transmitting end, a first receiving terminal electrode, a second receiving terminal electrode, a third receiving terminal electrode, and a fourth receiving terminal electrode respectively connected to the first receiving end, the second receiving end, the third receiving end, and the fourth receiving end, first and second control terminal electrodes respectively connected to the first and second control terminals, and a plurality of ground terminal electrodes electrically connected to the first ground electrode pattern, and the first control terminal electrode is placed between the first transmitting terminal electrode and the fourth receiving terminal electrode.

The 14th invention of the present invention is the high frequency switch according to the 13th invention, wherein the second control terminal electrode is placed between the second transmitting terminal electrode and the second receiving terminal electrode.

The 15th invention of the present invention is the high frequency switch according to the 13th invention, wherein at least one of the plurality of ground terminal electrodes is placed between the first receiving terminal electrode and the second receiving terminal electrode.

The 16th invention of the present invention is the high frequency switch according to the 13th invention, wherein at least one of the plurality of ground terminal electrodes is placed between the third receiving terminal electrode and the fourth receiving terminal electrode.

The 17th invention of the present invention is a high frequency switch, comprising:

branching means of branching reception signals and transmission signals into reception signals and transmission signals having lower frequencies than a predetermined frequency and reception signals and transmission signals having higher frequencies than the predetermined frequency, first transmission reception changeover means of switching a transmitting path and a receiving path, the transmitting path transmitting transmission signals from all or some of a plurality of frequency bands having lower frequencies than the predetermined frequency, the receiving path transmitting reception signals according to frequencies of the plurality of frequency bands having lower frequencies than the predetermined frequency, second transmission reception changeover means of switching a transmitting path and a receiving path, the transmitting path transmitting transmission signals from all or some of at least one frequency band having a higher frequency than the predetermined frequency, the receiving path transmitting a reception signal according to a frequency of at least one frequency band having a higher frequency than the predetermined frequency, and a common control terminal of performing control such that one of the transmitting path and the receiving path serving as switching targets of the first transmission reception changeover means and one of the transmitting path and the receiving path serving as switching targets of the second transmission reception changeover means are simultaneously connected to the branching means, wherein relationship of transmission and reception is reversed regarding one of the paths of the first transmission reception changeover means and one of the paths of the second transmission reception changeover means, the paths being connected simultaneously.

The 18th invention of the present invention is a high frequency switch, comprising:

branching means of branching reception signals and transmission signals into reception signals and transmission signals having lower frequencies than a predetermined frequency and reception signals and transmission signals having higher frequencies than the predetermined frequency, first transmission reception changeover means of switching a transmitting path and a receiving path, the transmitting path transmitting transmission signals from all or some of at least one frequency band having a lower frequency than the predetermined frequency, the receiving path transmitting a reception signal according to a frequency of at least one frequency band having a lower frequency than the predetermined frequency, second transmission reception changeover means of switching a transmitting path and a receiving path, the transmitting path transmitting transmission signals from all or some of a plurality of frequency bands having higher frequencies than the predetermined frequency, the receiving path transmitting reception signals according to frequencies of the plurality of frequency bands having higher frequencies than the predetermined frequency, and a common control terminal of performing control such that one of the transmitting path and the receiving path serving as switching targets of the first transmission reception changeover means and one of the transmitting path and the receiving path serving as switching targets of the second transmission reception changeover means are simultaneously connected to the branching means, wherein relationship of transmission and reception is reversed regarding one of the paths of the first transmission reception changeover means and one of the paths of the second transmission reception changeover means, the paths being connected simultaneously.

The 19th invention of the present invention is the high frequency switch according to the 17th invention, wherein the common control terminal comprises:

a first common control terminal of performing control such that a transmitting path and a receiving path are simultaneously connected to the branching means, the transmitting path transmitting a transmission signal of the first transmission reception changeover means, the receiving path transmitting a reception signal of the second transmission reception changeover means, and a second common control terminal of performing control such that a transmitting path and a receiving path are simultaneously connected to the branching means, the transmitting path transmitting a transmission signal of the second transmission reception changeover means, the receiving path transmitting a reception signal of the first transmission reception changeover means.

The 20th invention of the present invention is the high frequency switch according to the 18th invention, wherein the common control terminal comprises:

a first common control terminal of performing control such that a transmitting path and a receiving path are simultaneously connected to the branching means, the transmitting path transmitting a transmission signal of the first transmission reception changeover means, the receiving path transmitting a reception signal of the second transmission reception changeover means, and a second common control terminal of performing control such that a transmitting path and a receiving path are simultaneously connected to the branching means, the transmitting path transmitting a transmission signal of the second transmission reception changeover means, the receiving path transmitting a reception signal of the first transmission reception changeover means.

The 21st invention of the present invention is a high-frequency radio communication apparatus, comprising:

the high frequency switch according to any one of the 1st to 20th inventions, a receiving device which is connected to the high frequency switch and processes a reception signal, and a transmitter which is connected to the high frequency switch and generates a transmission signal.

The 22nd invention of the present invention is a method of a performing high frequency switch having a branching means of branching a transmission signal and a reception signal of four frequency bands according to a frequency, first and second transmission reception changeover means of performing switching to any one of the plurality of signal paths corresponding to the four frequency bands connected to the branching means, and a plurality of filters placed in the signal paths, comprising:

a step of switching among a first common transmitting end for transmission signals of the first frequency band and the second frequency band, a first receiving end for a reception signal of the first frequency band, and a second receiving end for a reception signal of the second frequency band by the first transmission reception changeover means, a step of switching among a second common transmitting end for transmission signals of the third frequency band and the fourth frequency band, a third receiving end for a reception signal of the third frequency band, and a fourth receiving end for a reception signal of the fourth frequency band by the second transmission reception changeover means.

DESCRIPTION OF SYMBOLS 1, 2 Switched circuit (transmission reception changeover circuit)
3 Branching filter circuit
20 Antenna terminal
21, 22, 23, 24 Internal terminal
12, 13 Low-pass filter (LPF)

DETAILED DESCRIPTION OF THE PREFERRED EMBODIMENTS

The following will discuss embodiments of the present invention in accordance with the accompanied drawings.

Embodiment 1

Figure 1:
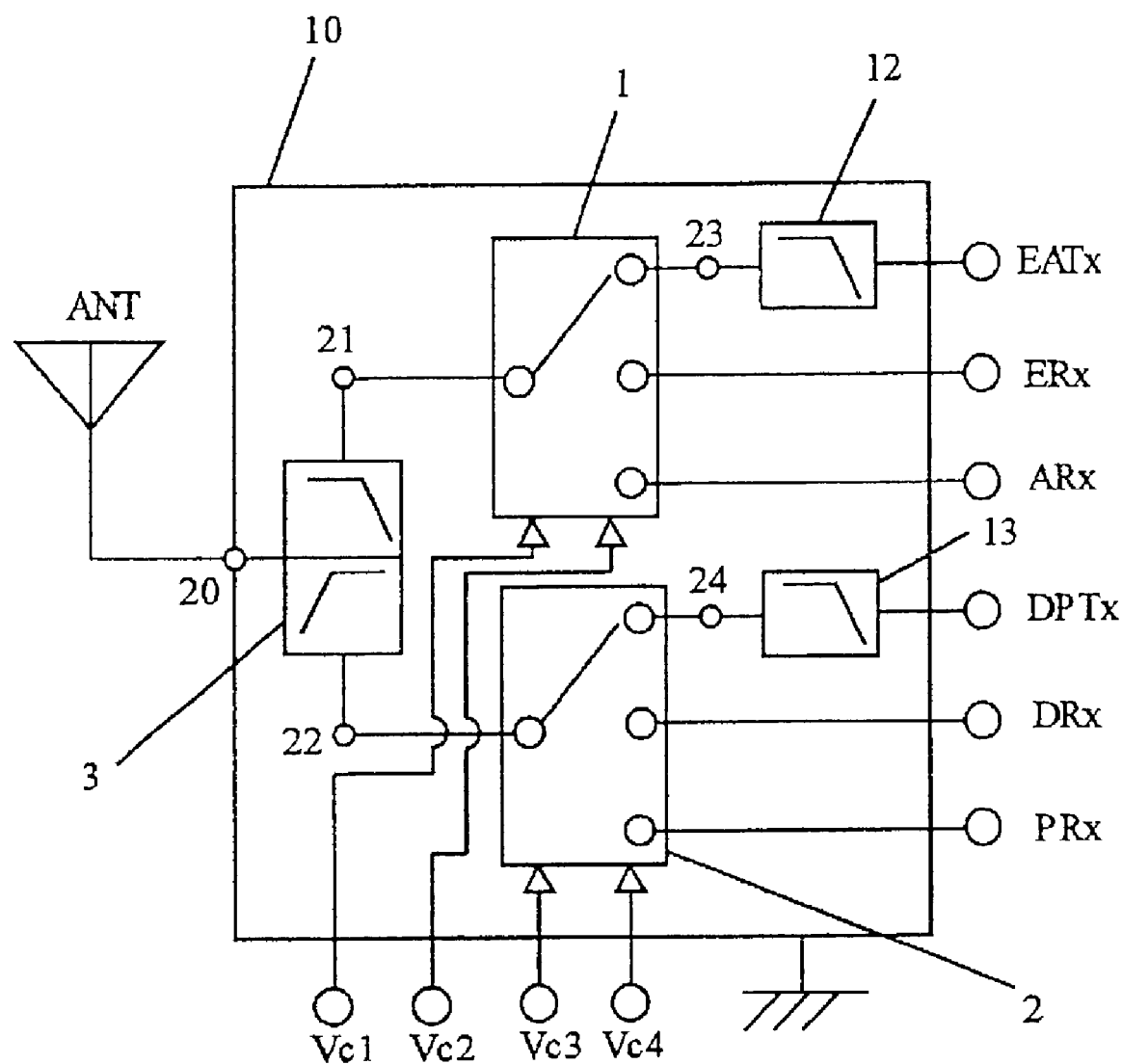
FIG. 1 is a block diagram showing a high frequency switch according to Embodiment 1 of the present invention.

First, mainly referring to FIG. 1, the configuration of a high frequency switch will be discussed according to Embodiment 1. FIG. 1 is a block diagram showing the high frequency switch of Embodiment 1.

A high frequency switch 10 of Embodiment 1 is a high frequency switch for four bands that has a filtering function permitting passage of transmissions frequency band and reception frequency bands included in an EGSM frequency band serving as an example of a first frequency band of the present invention, an AMPS frequency band serving as an example of a second frequency band of the present invention, a DCS frequency band serving as an example of a third frequency band of the present invention, and a PCS frequency band serving as an example of a fourth frequency band of the present invention. The high frequency switch 10 comprises a first switched circuit 1 serving as an example of first transmission reception changeover means of the present invention, a second switched circuit 2 serving as an example of second transmission reception changeover means of the present invention, and a branching filter circuit 3 serving as an example of branching means of the present invention.

Next, the means of the high frequency switch 10 of Embodiment 1 will be discussed in a more specific manner.

The branching filter circuit 3 is means having internal terminals 21 and 22, an antenna terminal 20 of making connection to an antenna (ANT), a low-pass filter (LPF) which connects the internal terminal 21 and the antenna terminal 20 and permits passage on the first and second frequency bands, and a high-pass filter (HPF) which connects the internal terminal 22 and the antenna terminal 20 and permits passage on the third and fourth frequency bands. Namely, the branching filter circuit 3 is configured so as to branch a transmission signal and a reception signal having a lower frequency than a predetermined frequency and a transmission signal and a reception signal having higher frequency than the predetermined frequency. To be specific, the branching filter circuit 3 branches reception signals into reception signals having lower frequencies than the predetermined frequency and reception signals having higher frequencies than the predetermined frequency, and the branching filter circuit 3 transmits a transmission signal having a lower frequency than the predetermined frequency or a transmission signal having a higher frequency than the predetermined frequency out of transmission signals from a single antenna.

The first switched circuit 1 serving as an example of the first transmission reception changeover means of the present invention is connected to the internal terminal 21 to switch a transmitting terminal EATx, which is used for transmissions of the first and second frequency bands (shared for the two transmissions) and is an example of a first common transmitting terminal of the present invention, a first receiving terminal ERx used for reception of the first frequency band, and a second receiving terminal ARx used for reception of the second frequency band. Besides, a first low-pass filter (LPF) 12 is inserted between the transmitting terminal EATx and the internal terminal 23 of the first switched circuit 1. The first low-pass filter 12 is provided for reducing harmonic distortion caused by amplification during transmission using the transmitting terminal EATx.

The second switched circuit 2 serving as an example of the second transmission reception changeover means of the present invention is connected to the internal terminal 22 to switch a transmitting terminal DPTx, which is used for transmissions of the third and fourth frequency bands (shared for the two transmissions) and is an example of a second common transmitting terminal of the present invention, a third receiving terminal DRx used for reception of the third frequency band, and a fourth receiving terminal PRx used for reception of the fourth frequency band. Besides, a second low-pass filter (LPF) 13 is inserted between the transmitting terminal DPTx and the internal terminal 24 of the second switched circuit 2. The second low-pass filter 13 is provided for reducing harmonic distortion caused by amplification during transmission using the transmitting terminal DPTx.

Further, the first switched circuit 1 is connected to control power terminals Vc1 and Vc2 which switch on/off of a plurality of diodes, and the second switched circuit 2 is similarly connected to control power terminals Vc3 and Vc4 which switch on/off of a plurality of diodes.

As described above, FIG. 1 shows that the first switched circuit 1 and the second switched circuit 2 each have one input port and three output ports.

Figure 2:
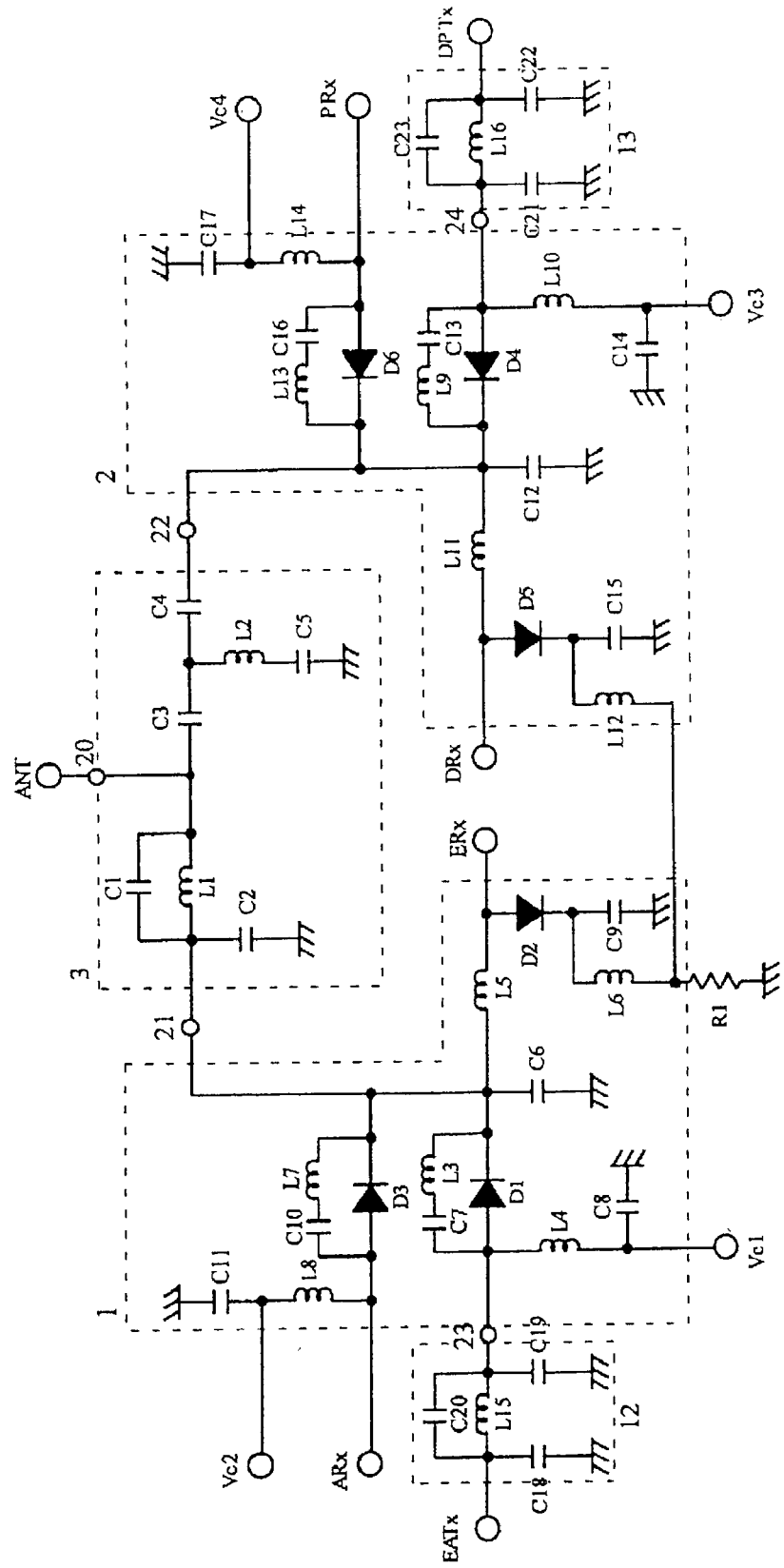
FIG. 2 is a circuit diagram showing the high frequency switch according to Embodiment 1 of the present invention.

Next, referring to FIG. 2, the following will discuss the detailed circuit configuration of the blocks in the high frequency switch according to Embodiment 1. FIG. 2 is a circuit diagram showing the high frequency switch of Embodiment 1.

The branching filter circuit 3 serving as an example of the branching means of the present invention is constituted by inductors L1 and L2 and capacitors C1 to C5. The inductor L1 and the capacitor C1 are connected in parallel between the antenna terminal 20 and the internal terminal 21, and the internal terminal 21 is grounded via the capacitor C2. Moreover, the capacitor C3 and the capacitor C4 are connected in series between the antenna terminal 20 and the internal terminal 22, and the node of the capacitor C3 and the capacitor C4 is grounded via a series circuit of the inductor L2 and the capacitor C5.

The first switched circuit 1 is constituted by diodes D1 to D3, inductors L3 to L8, capacitors C6 to C11, and a resistor R1 commonly used by the first and second switched circuits 1 and 2.

The diode D1 has the anode connected to the third internal terminal 23 and the cathode connected to the internal terminal 21, and a series circuit of the inductor L3 and the capacitor C7 is connected in parallel with the diode D1. Moreover, the anode of the diode D1 is grounded via a series circuit of the inductor L4 and the capacitor C8, and the node of the inductor L4 and the capacitor C8 is connected to the first control power terminal Vc1.

Further, the inductor L5 connects the internal terminal 21 and the first receiving terminal ERx, and the internal terminal 21 is grounded via the capacitor C6. Further, the anode of the diode D2 is connected to the first receiving terminal ERx and the cathode of the diode D2 is grounded via the capacitor C9 and is grounded via a series circuit of the inductor L6 and the resistor R1.

Moreover, the diode D3 has the anode connected to the second receiving terminal ARx and the cathode connected to the internal terminal 21, and a series circuit of the inductor L7 and the capacitor C10 is connected in parallel with the diode D3. Moreover, the anode of the diode D3 is grounded via a series circuit of the inductor L8 and the capacitor C11, and the node of the inductor L8 and the capacitor C11 is connected to the second control power terminal Vc2.

The second switched circuit 2 is constituted by diodes D4 to D6, inductors L9 to L14, capacitors C12 to C17, and a resistor R1 commonly used by the first and second switched circuits 1 and 2.

The diode D4 has the anode connected to the internal terminal 24 and the cathode connected to the internal terminal 22, and a series circuit of the inductor L9 and the capacitor C13 is connected in parallel with the diode D4. Moreover, the anode of the diode D4 is grounded via a series circuit of the inductor L10 and the capacitor C14, and the node of the inductor L10 and the capacitor C14 is connected to the third control power terminal Vc3.

Further, the inductor L11 connects the internal terminal 22 and the third receiving terminal DRx, and the internal terminal 22 is grounded via the capacitor C12. Moreover, the anode of the diode D5 is connected to the third receiving terminal DRx and the cathode of the diode D5 is grounded via the capacitor C15 and is grounded via a series circuit of the inductor L12 and the resistor R1.

Moreover, the diode D6 has the anode connected to the fourth receiving terminal PRx and the cathode connected to the internal terminal 22, and a series circuit of the inductor L13 and the sixteenth capacitor C16 is connected in parallel with the diode D6. Moreover, the anode of the diode D6 is grounded via a series circuit of the inductor L14 and the capacitor C17, and the node of the inductor L14 and the capacitor C17 is connected to the fourth control power terminal Vc4.

Moreover, the first low-pass filter 12 is constituted by an inductor L15 and capacitors C18 to C20, a parallel circuit of the inductor L15 and the capacitor C20 connects the fourth internal terminal 23 and the transmitting terminal EATx, the internal terminal 23 is grounded via the capacitor C19, and the transmitting terminal EATx is grounded via the capacitor C18.

Moreover, the second low-pass filter 13 is constituted by an inductor L16 and capacitors C21 to C23, a parallel circuit of the inductor L16 and the capacitor C23 connects the internal terminal 24 and the transmitting terminal DPTx, the internal terminal 24 is grounded via the capacitor C21, and the transmitting terminal DPTx is grounded via the capacitor C22.

As described above, the path from the terminal EATx to the branching filter circuit 3, the path from the terminal ERx to the branching filter circuit 3, the path from the terminal ARx to the branching filter circuit 3, the path from the terminal DPTx to the branching filter circuit 3, the path from the terminal DRx to the branching filter circuit 3, and the path from the terminal PRx to the branching filter circuit 3 are each connected to the branching filter circuit 3 as switching targets and are equivalent to an example of a plurality of signal paths of the present invention.

Next, the following will discuss the operation of the high frequency switch 10 according to Embodiment 1. First, when an EGSM or AMPS transmission signal is transmitted, 3V is applied to the first control power terminal Vc1 of the first switched circuit 1, 0V is applied to the second control power terminal Vc2, and the internal terminal 21 and the internal terminal 23 of the first switched circuit 1 are connected to each other. Thus, the EGSM or AMPS transmission signal passes through the first low-pass filter 12, the first switched circuit 1, and the branching filter circuit 3, and the signal is transmitted from the antenna. At this moment, 0V is applied to the third control power terminal Vc3 and the fourth control power terminal Vc4 of the second switched circuit 2.

First, when an EGSM reception signal is received, 0V is applied to the first and second control power terminals Vc1 and Vc2 of the first switched circuit 1, and the first internal terminal 21 and the first receiving terminal ERx of the first switched circuit 1 are connected to each other. Thus, the EGSM reception signal passes through the branching filter circuit 3 and the first switched circuit 1 from the antenna, and the signal is transmitted to the first receiving terminal ERx. At this moment, 0V is applied to the third control power terminal Vc3 and the fourth control power terminal Vc4 of the second switched circuit 2.

Next, when an AMPS reception signal is received, 0V is applied to the first control power terminal Vc1 of the first switched circuit 1, 3V is applied to the second control power terminal Vc2, and the first internal terminal 21 and the second receiving terminal ARx of the first switched circuit 1 are connected to each other. Thus, the AMPS reception signal passes through the branching filter circuit 3 and the first switched circuit 1 from the antenna, and the signal is transmitted to the second receiving terminal ARx. At this moment, 0V is applied to the third control power terminal Vc3 and the fourth control power terminal Vc4 of the second switched circuit 2.

When a DCS or PCS transmission signal is transmitted, 3V is applied to the third control power terminal Vc3 of the second switched circuit 2, 0V is applied to the fourth control power terminal Vc4, and the internal terminal 22 and the internal terminal 24 of the second switched circuit 2 are connected to each other. Thus, the DCS or PCS transmission signal passes through the second low-pass filter 13, the second switched circuit 2, and the branching filter circuit 3, and the signal is transmitted from the antenna. At this moment, 0V is applied to the first control power terminal Vc1 and the second control power terminal Vc2 of the first switched circuit 1.

Next, when a DCS reception signal is received, 0V is applied to the third and fourth control power terminals Vc3 and Vc4 of the second switched circuit 2, and the second internal terminal 22 and the third receiving terminal DRx of the second switched circuit 2 are connected to each other. Thus, the DCS reception signal passes through the branching filter circuit 3 and the second switched circuit 2 from the antenna, and the signal is transmitted to the third receiving terminal DRx. At this moment, 0V is applied to the first control power terminal Vc1 and the second control power terminal Vc2 of the first switched circuit 1.

Next, when a PCS reception signal is received, 0V is applied to the third control power terminal Vc3 of the second switched circuit 2, 3V is applied to the fourth control power terminal Vc4, and the internal terminal 22 and the fourth receiving terminal PRx of the second switched circuit 2 are connected to each other. Thus, the PCS reception signal passes through the branching filter circuit 3 and the second switched circuit 2 from the antenna, and the signal is transmitted to the fourth receiving terminal PRx. At this moment, 0V is applied to the first control power terminal Vc1 and the second control power terminal Vc2 of the first switched circuit 1.

As described above, control voltage is turned on and off across the first control power terminal Vc1 to the fourth control power terminal Vc4. Thus, it is possible to change the state of the high frequency switch of the present embodiment. Table 1 shows a list of on/off combinations of control voltages on the control terminals.

TABLE 1

| Voltage (V) | EGSM AMPS Transmission | EGSM Reception | AMPS Reception | DCS PCS Transmission | DCS Reception | PCS Reception |
|---|---|---|---|---|---|---|
| Vc1 | 3 | 0 | 0 | 0 | 0 | 0 |
| Vc2 | 0 | 0 | 3 | 0 | 0 | 0 |
| Vc3 | 0 | 0 | 0 | 3 | 0 | 0 |
| Vc4 | 0 | 0 | 0 | 0 | 0 | 3 |

As described above, according to Embodiment 1, with the four-port configuration in which the first switched circuit 1 and the second switched circuit 2 each use three diodes, it is possible to achieve a high frequency switch for four bands while preventing a circuit from being larger than that of a conventional high frequency switch for dual bands.

The above explanation discussed the high frequency switch for four bands. The high frequency switch of the present invention may be devised as a high frequency switch for more bands. In this case, transmitting terminals are preferably configured such that the ports are fewer than twice the number of bands. For example, in the case of a high frequency switch for six bands, transmitting terminals may use a three-band transmission signal in common, or the high frequency switch may be constituted by transmitting terminals using a two-band transmission signal in common and a transmitting terminal using a single-band transmission signal.

(Embodiment 2)

Figure 3:
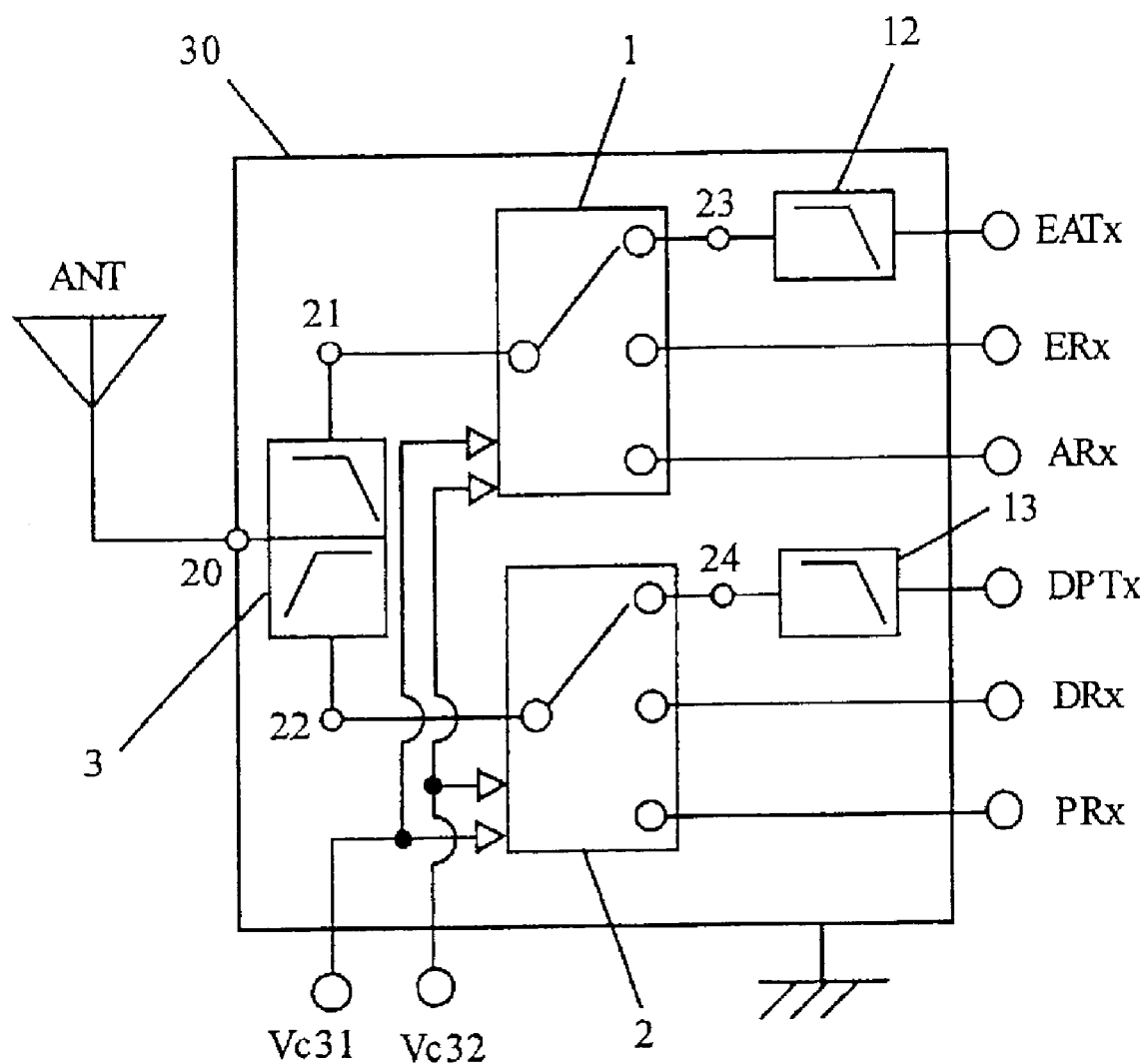
FIG. 3 is a block diagram showing a high frequency switch according to Embodiment 2 of the present invention.

Next, referring to FIG. 3, the following will discuss the configuration of a high frequency switch according to Embodiment 2. FIG. 3 is a block diagram showing the high frequency switch of Embodiment 2.

As in the case of the high frequency switch of Embodiment 1, a high frequency switch 30 of Embodiment 2 is a high frequency switch for four bands that has a filtering function permitting transmission on transmission frequency bands and reception on reception frequency bands included in a first frequency band (EGSM), a second frequency band (AMPS), a third frequency band (DCS), and a fourth frequency band (PCS). The high frequency switch 30 comprises first and second switched circuits (transmission reception changeover circuit) 1 and 2 and a branching filter circuit 3. Thus, the following will discuss parts different from those of the high frequency switch 10 of Embodiment 1.

In the high frequency switch 30 of Embodiment 2, a control power terminal which switches on/off of a plurality of diodes of a first switched circuit 1 and a control power terminal which switches on/off of a plurality of diodes of a second switched circuit 2 are commonly used as a control power terminal Vc31, which is an example of a first control terminal of the present invention, and as a control power terminal Vc32, which is an example of a second control power terminal of the present invention.

Figure 4:
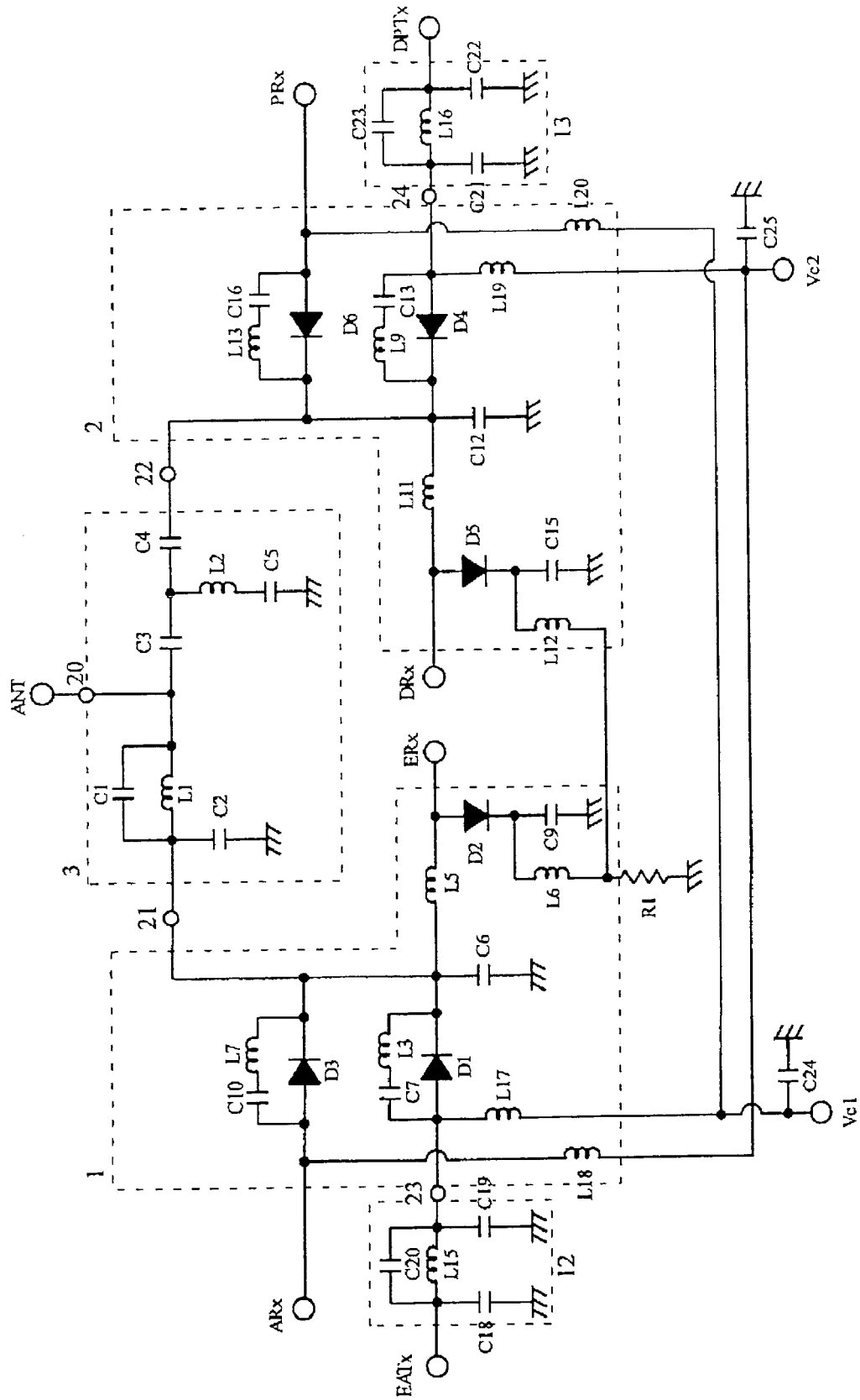
FIG. 4 is a circuit diagram showing the high frequency switch according to Embodiment 2 of the present invention.

Next, referring to FIG. 4, the following will discuss the circuit configuration of the high frequency switch 30 according to Embodiment 2. Besides, FIG. 4 is a circuit diagram showing the high frequency switch of Embodiment 2. Elements corresponding to those of the high frequency switch of Embodiment 1 in FIG. 2 are indicated by the same reference numerals as FIG. 2. Here, the branching filter circuit 3, a first low-pass filter 12, and a second low-pass filter 13 are identical to those of Embodiment 1 in circuit configuration. Hence, the explanation thereof is omitted.

Further, as to the first switched circuit 1 and the second switched circuit 2, only parts different from those of Embodiment 1 will be described in detail.

In the first switched circuit 1, the anode of a diode D1 serving as an example of a first diode of the present invention is grounded via a series circuit of an inductor L17 and a capacitor C24. The inductor L17 is an example of a first inductor of the present invention and the capacitor C24 is shared by the first and second switched circuits 1 and 2 and is an example of a first capacitor of the present invention. The node of the inductor L17 and the capacitor C24 is connected to the first control power terminal Vc31 connected to a first common control power supply.

Further, the anode of a diode D3 serving as an example of a fourth diode of the present invention is grounded via a series circuit of an inductor L18 and a capacitor C25. The inductor L18 is an example of a fourth inductor of the present invention and the capacitor C25 is shared by the first and second switched circuits 1 and 2 and is an example of a second capacitor of the present invention. The node of the inductor L18 and the capacitor C25 is connected to the second control power terminal Vc32 connected to a second common control power supply.

Moreover, in the second switched circuit 2, the anode of a diode D4 serving as an example of a third diode of the present invention is grounded via a series circuit of an inductor L19 and a capacitor C24. The inductor L19 is an example of a third inductor of the present invention and the capacitor C24 is shared by the first and second switched circuits 1 and 2. The node of the inductor L19 and the capacitor C24 is connected to the first control power terminal Vc31.

Furthermore, the anode of a diode D6 serving as an example of a second diode of the present invention is grounded via a series circuit of an inductor L20 and a capacitor C25. The inductor L20 is an example of a second inductor of the present invention and the capacitor C25 is shared by the first and second switched circuits 1 and 2. The node of the inductor L20 and the capacitor C25 is connected to the second control power terminal Vc32.

Besides, as the inductors L17 to L20, inductors are selected which permit sufficiently large impedance on frequency bands of transmission and reception signals of EGSM and AMPS.

Next, the following will discuss the operation of the high frequency switch 30 according to Embodiment 2. First, when an EGSM or AMPS transmission signal is transmitted, 3V is applied to the first control power terminal Vc31, 0V is applied to the second control power terminal Vc32, and the internal terminal 21 and the internal terminal 23 of the first switched terminal 1 are connected to each other. Thus, the EGSM or AMPS transmission signal passes through a first low pass filter 12, the first switched circuit 1, and the branching filter circuit 3, and the signal is transmitted from the antenna.

Next, when an EGSM reception signal is received, 0V is applied to the first and second control power terminals Vc31 and Vc32, and the internal terminal 21 and the first receiving terminal ERx of the first switched terminal 1 are connected to each other. Thus, the EGSM reception signal passes through the branching filter circuit 3 and the first switched circuit 1 from the antenna, and the signal is transmitted to the first receiving terminal ERx.

Next, when an AMPS reception signal is received, 0V is applied to the first control power terminal Vc31, 3V is applied to the second control power terminal Vc32, and the internal terminal 21 and the second receiving terminal ARx of the first switched terminal 1 are connected to each other. Thus, the AMPS reception signal passes through the branching filter circuit 3 and the first switched circuit 1 from the antenna, and the signal is transmitted to the second receiving terminal ARx.

When a DCS or PCS transmission signal is transmitted, 3V is applied to the first control power terminal Vc32, 0V is applied to the second control power terminal Vc31, and the internal terminal 22 and the internal terminal 24 of the second switched circuit 2 are connected to each other. Thus, the DCS or PCS transmission signal passes through a second low-pass filter 13, the second switched circuit 2, and the branching filter circuit 3, and the signal is transmitted from the antenna.

Next, when a DCS reception signal is received, 0V is applied to the first and second control power terminals Vc31 and Vc32, and the internal terminal 22 and the third receiving terminal DRx of the second switched circuit 2 are connected to each other. Thus, the DCS reception signal passes through the branching filter circuit 3 and the second switched circuit 2 from the antenna, and the signal is transmitted to the third receiving terminal DRx.

Next, when a PCS reception signal is received, 0V is applied to the first control power terminal Vc31, 3V is applied to the second control power terminal Vc32, and the internal terminal 22 and the fourth receiving terminal PRx of the second switched circuit 2 are connected to each other. Thus, the PCS reception signal passes through the branching filter circuit 3 and the second switched circuit 2 from the antenna, and the signal is transmitted to the fourth receiving terminal PRx.

With this configuration, an EGSM or AMPS transmission signal and a DCS or PCS transmission signal are not transmitted at the same time. Hence, it is possible to sufficiently obtain isolation between the transmitting terminal EATx and the transmitting terminal DPTx, thereby preventing routing of a harmonic distortion signal during transmission.

As described above, control voltages are turned on/off over the first control power terminal Vc31 and the second control power terminal Vc32, so that the state of the high frequency switch of the present embodiment can be changed. Table 2 shows a list of on/off combinations of control voltages on the control terminals.

As described above, according to Embodiment 2, the inductors connected to the control power terminals are selected so as to have sufficiently large impedance on the first to fourth frequency bands. Thus, it is possible to share the power terminals which control on/off of the plurality of diodes of the first switched circuit 1 and the second switched circuit 2, thereby reducing the number of the control power terminals.

Besides, the above explanation is based on the high frequency switch for four bands. The high frequency switch of the present invention may be devised as a multi-band high frequency switch. In this case, the transmitting terminals are configured with ports fewer than twice the number of bands, and a common control power terminal is preferably formed such that the transmitting terminal of the first transmission reception changeover means and any one of the receiving terminals of the second transmission reception changeover means are simultaneously connected to the branching filter circuit 3, and a common control power terminal is preferably formed such that the transmitting terminal of the second transmission reception changeover means and any one of the receiving terminals of the first transmission reception changeover means are simultaneously connected to the branching filter circuit 3.

In contrast to the above explanation, the high frequency switch of the present embodiment may be devised as a high frequency switch for three bands. In this case, in the example of the high frequency switch shown in FIG. 3, the EAtx connected to the switched circuit 1 is a transmitting terminal shared for two bands, the DPTx connected to the switched circuit 2 is another transmitting terminal for one band, and one of the DRx and PRx is omitted. Conversely, the EATx is a transmitting terminal used for one band, DPTx is a transmitting terminal shared for two bands, and one of the ERx and ARx is omitted.

Besides, as in the case of the example of tree bands, the high frequency switch for four bands may be configured as follows: the EATx connected to the switched circuit 1 is a transmitting terminal shared for three bands, and the DPTx connected to the switched circuit 2 is a transmitting terminal for one band. Besides, in the case of a high frequency switch for a multi-band configuration having more than four bands, the corresponding bands used for the transmitting terminal connected to the switched circuit 1 may be different in number from the corresponding bands used for the transmitting terminal connected to the switched circuit 2.

In this case, the high frequency switch of the present invention preferably comprises a first common control terminal and a second common control terminal. The first common control terminal performs control such that a transmitting path to be a switching target of the switched circuit 1 and a receiving path to be a switching target of the switched circuit 2 are simultaneously connected to the branching filter circuit 3. The second common control terminal performs control such that a transmitting path to be a switching target of the switched circuit 2 and a receiving

TABLE 2

| Voltage (V) | EGSM AMPS Transmission | EGSM Reception | AMPS Reception | DCS PCS Transmission | DCS Reception | PCS Reception |
|---|---|---|---|---|---|---|
| Vc31 | 3 | 0 | 0 | 0 | 0 | 3 |
| Vc32 | 0 | 0 | 3 | 3 | 0 | 0 | path to be a switching target of the switched circuit 1 are simultaneously connected to the branching filter circuit 3.

(Embodiment 3)

Figure 5:
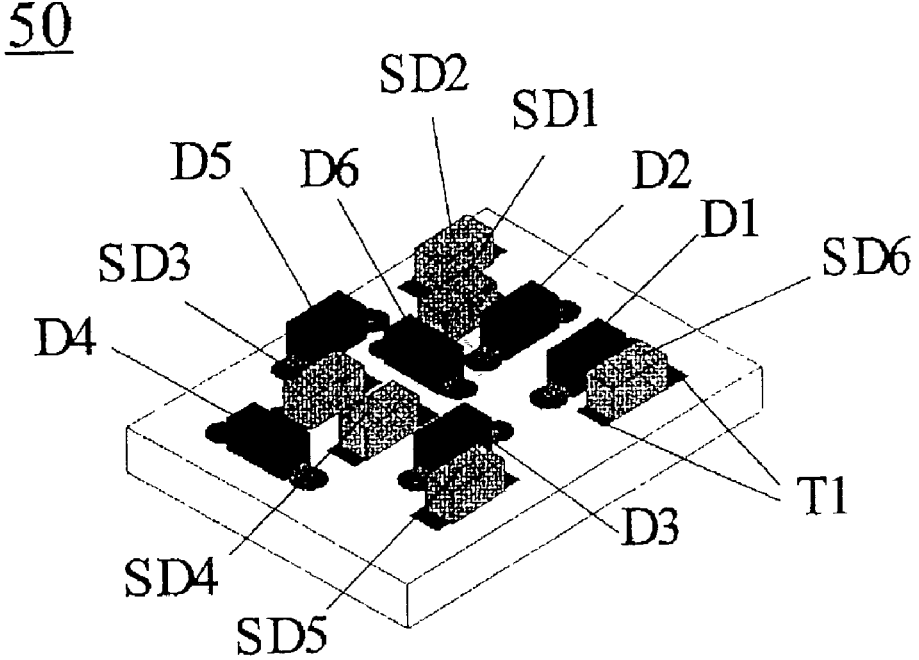
FIG. 5(a) is an explanatory drawing showing a high frequency switch (front) according to Embodiment 3 of the present invention.
FIG. 5(b) is an explanatory drawing showing the high frequency switch (back) according to Embodiment 3 of the present invention.
Figure 5:
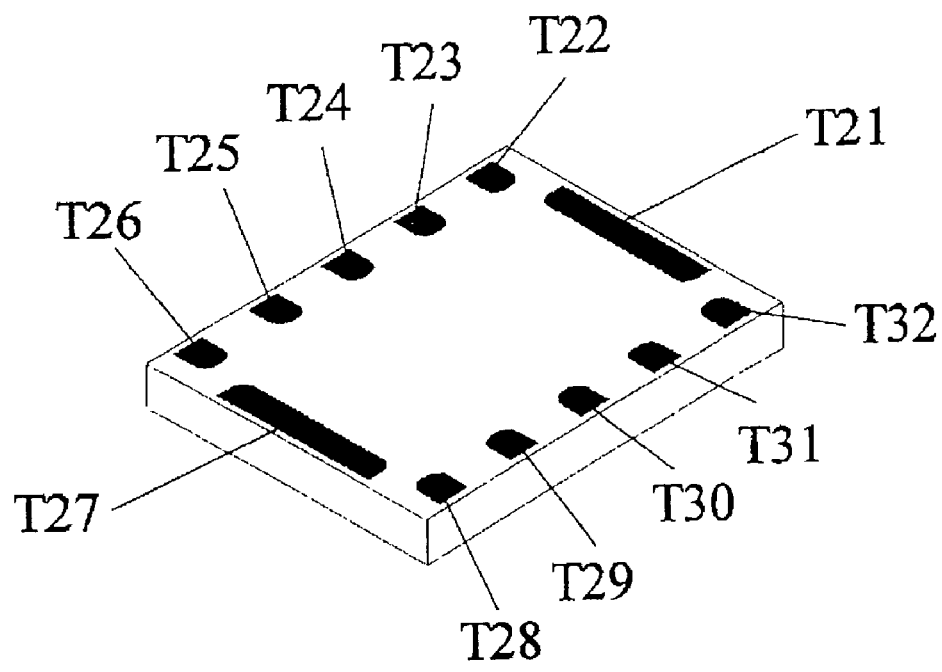
Figure 6:
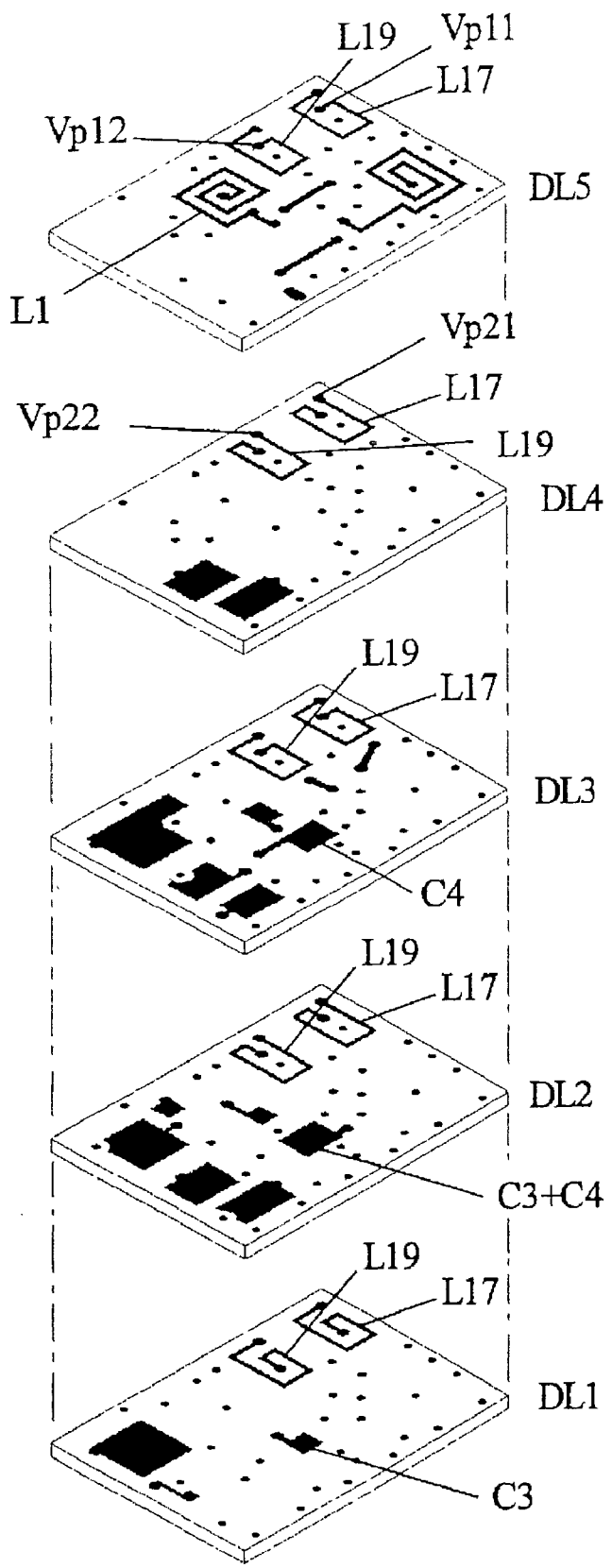
FIG. 6 is an exploded perspective view showing a part of the high frequency switch according to Embodiment 3 of the present invention.

Referring to FIGS. 5 and 6, the following will discuss the configuration of a high frequency switch according to Embodiment 3. FIG. 5(*a*) is an explanatory drawing showing the high frequency switch (front) according to Embodiment 3. FIG. 5(*b*) is an explanatory drawing showing the high frequency switch (back) according to Embodiment 3. FIG. 6 is a partial exploded perspective view showing the high frequency switch according to Embodiment 3.

The high frequency switch of Embodiment 3 is constituted by a plurality of laminated dielectric layers DL. The number of stacked dielectric layers is properly selected according to necessary characteristics of the high frequency switch.

Besides, as the dielectric layer, a so-called glass ceramic substrate is applicable, in which low-melting glass frit is mixed with ceramic powder such as a compound having forsterite or alumina as a main component. Further, on green sheets formed by slurry obtained by mixing an organic binder and an organic solvent with the ceramic powder, a number of via holes which electrically connect multilayer wiring are bored by mechanical punching or laser beam machining.

Printing is carried out by using conductive paste having silver (gold or copper) powder as a main component of a conductor to form wiring patterns on a predetermined green sheet, and conductive paste is printed and filled in the via holes which make interlayer connection between the wiring patterns of the green sheets. Thus, the strip lines and capacitor electrodes are formed.

The plurality of green sheets are accurately aligned, the dielectric layers DL are stacked in order, and the layers are increased in temperature and pressure under a certain condition, so that an integrated layered body can be obtained. After the layered body is dried, the organic binder in the green sheet is burned out by performing burning at 400 to 500° C. in a kiln in an oxidizing atmosphere. As a main component of the conductor, burning is carried out around at 850 to 950° C. (1) in ordinary air when gold or silver powder is used and (2) in an inert gas or reduction atmosphere when copper powder is used. In this manner, a final layered body 50 can be obtained.

As shown in FIG. 5, on the upper surface of the layered body 50, which has a lamination structure including various strip lines and capacitors that constitute the high frequency switch, diodes D1 to D6 and chip components SD1 to SD6 such as a capacitor and a resistor are mounted via terminals T1, which are formed on the upper surface of the layered body 50, and are electrically connected to internal circuits of the layered body 50.

A plurality of terminals T21 to T32, which surface-mount the high frequency switch on the main substrate of electronic equipment, is formed on the back of the layered body 50. Here, the terminals T1 and T21 to T32 are formed by printing and patterning the above-mentioned conductive paste.

Referring to some examples, the following will discuss the layered structure of the wiring patterns in the high frequency switch having such a lamination structure.

A strip line electrode pattern on the dielectric layer DL5 makes interlayer connection with a strip line electrode pattern on the dielectric layer DL4 through via hole electrodes Vp11 and Vp21. Moreover, the strip line electrode pattern on the dielectric layer DL4 makes interlayer connection with a strip line pattern on the dielectric layer DL3 through via hole electrodes Vp12 and Vp22. In this manner, for example, a strip line L17 constituting an inductor 17 and a strip line L19 constituting an inductor 19 are connected sequentially to the five layers of the dielectric layers DL1 to DL5 respectively through the via hole electrodes.

Also, capacitors C3 and C4 are connected in series by providing the electrode pattern of the capacitor C3 on the dielectric layer DL1, an electrode pattern shared by the capacitors C3 and C4 on the dielectric layer DL2, and the electrode pattern of the capacitor C4 on the dielectric layer DL3.

Similarly, the strip line electrode patterns, the capacitor electrode patterns, and the via hole electrodes are properly arranged and are electrically connected to diodes and so on mounted on the surface layer of the layered body 50 in a suitable manner, so that a high frequency switched circuit of FIG. 4 is configured on the layered body 50. Here, the strip lines L17 and L19 and the capacitors C3 and C4 of FIG. 6 correspond to the inductors and capacitors of FIG. 4.

The strip lines and capacitors are configured thus The input/output terminals of the high frequency switch of the present embodiment are all gathered on the back of the layered body 50 through the via holes. Thus, a mounting area can be reduced when the switch is mounted on the main substrate of electronic equipment.

Further, the strip line L17 and the strip line L20 are placed in a laminating direction so as not to overlap each other. Hence, it is possible to prevent connection between the strip lines, thereby sufficiently obtaining isolation between the first high frequency switch 1 and the second high frequency switch 2.

Further, a ground electrode pattern 80 is placed between the strip line L17 and the strip line L20 in the laminating direction, thereby further improving isolation between the first high frequency switch 1 and the second high frequency switch 2.

Figure 7:
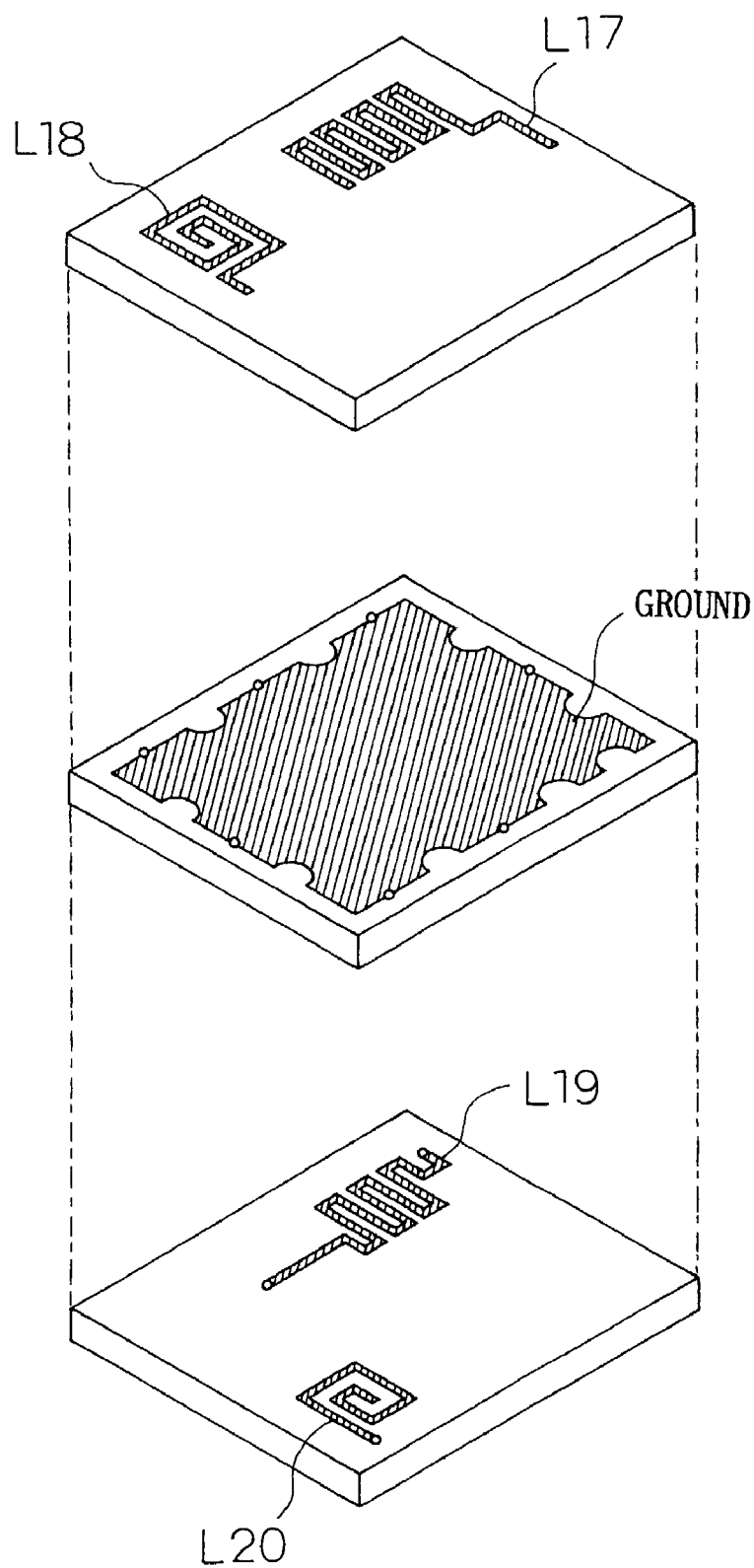
FIG. 7 is an exploded perspective view showing a part of the high frequency switch according to Embodiment 3 of the present invention.
Figure 8:
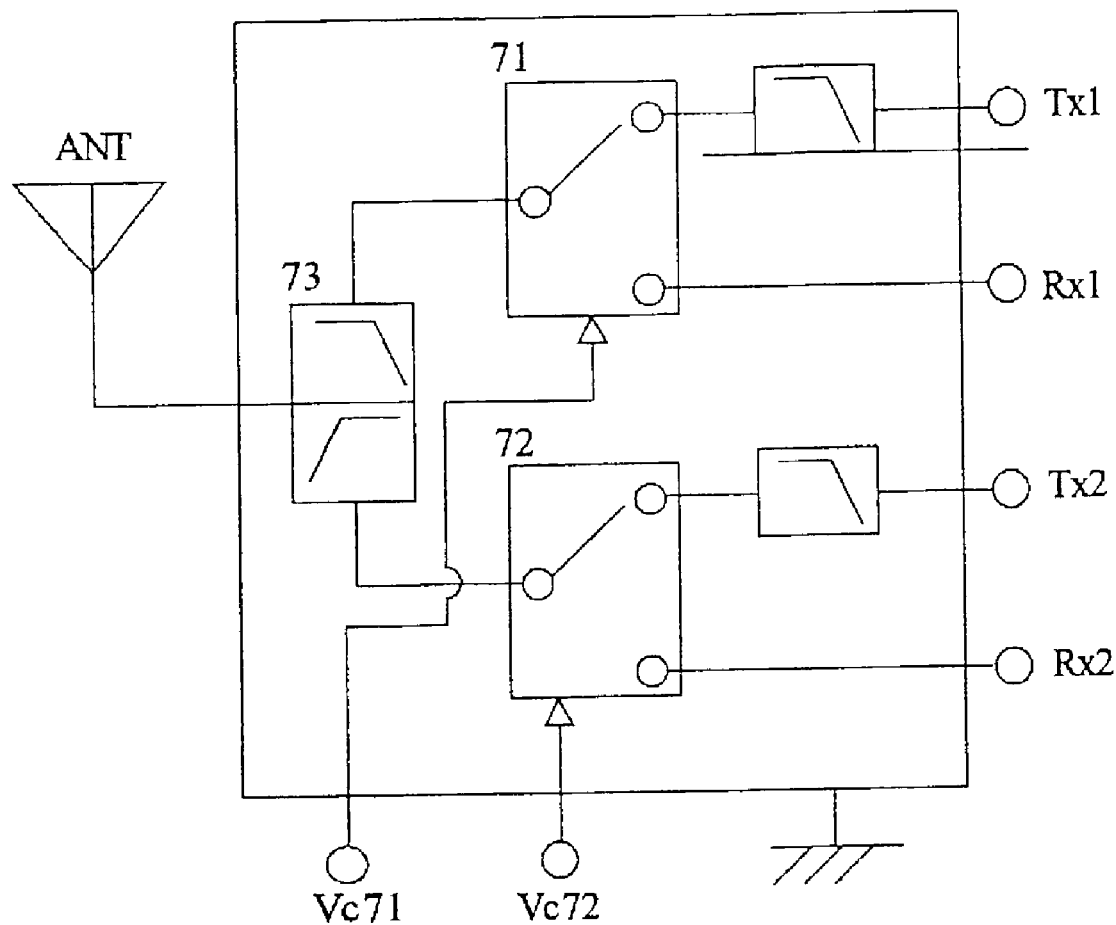
FIG. 8 is a block diagram showing a conventional high frequency switch.
Figure 9:
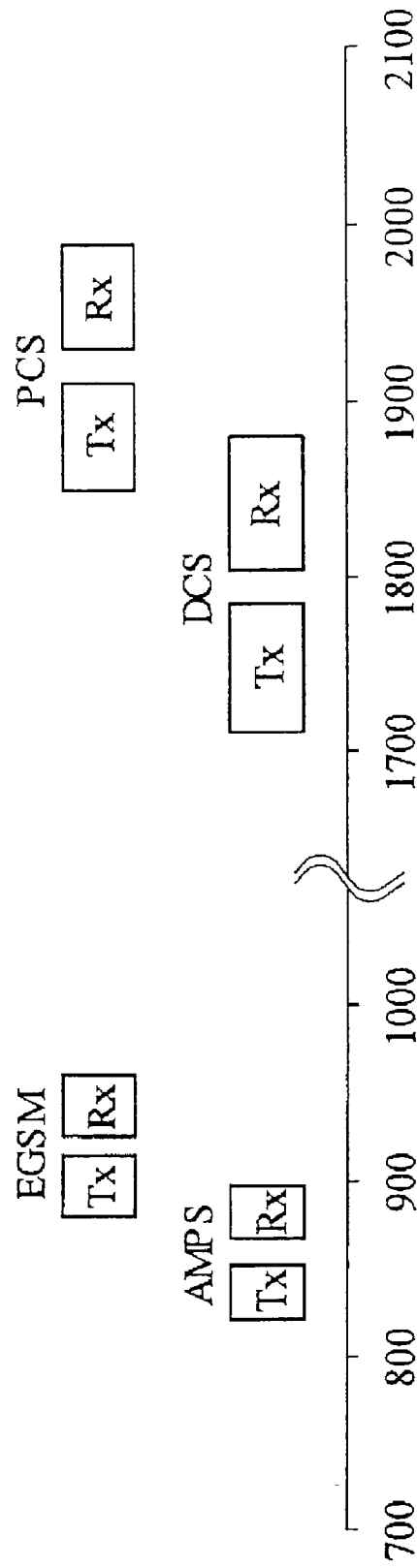
FIG. 9 is an explanatory drawing showing the corresponding frequency bands of EGSM, AMPS, DCS, and PCS.

Embodiment 3 discussed the relationship between the inductor L17 and the inductor L20. The same effect can be achieved between the inductor L18 and the inductor L19 (see FIG. 7).

Moreover, a strip line L1 constituting an inductor L1 is placed on the dielectric layer DL5. The strip lines L17 and L19 are smaller in width than strip lines other than the strip lines L17 and L19, for example L1, so that an inductor having a large inductor value with a small area can be configured and interference with other strip lines can be prevented. Further, this holds true for the strip lines L18 and L20.

Further, as to a plurality of terminals formed on the bottom of the layered body 50, T26 is used as a terminal electrode connected to the transmitting terminal EATx, T25 is used as a terminal electrode connected to the first control power terminal Vc1, and T24 is used as a terminal electrode connected to the receiving terminal PRx. Thus, it is possible to minimize the routing of lines from the first control power terminal Vc1, thereby contributing to formation of a small device. Moreover, the control power terminal permitting only passage of a DC signal is placed between terminal electrodes on which a high-frequency signal passes, thereby obtaining isolation between the terminals.

Similarly, T28 is used as a terminal electrode connected to the transmitting terminal DPTx, T29 is used as a terminal electrode connected to the second control power terminal Vc2, and T30 is used as a terminal electrode connected to the second receiving terminal ARx, thereby achieving the same effect.

Further, T21, T23, T27 and T31 are used as, for example, ground terminal electrodes connected to the ground electrodes on the main substrate of a mobile phone. T22 is used as a terminal electrode mainly connected to the third receiving terminal DRx, and T32 is used as a terminal electrode connected to the first receiving terminal ERx. With this configuration, it is possible to prevent interference of signals on close receiving frequency bands between the first receiving terminal ERx and the second receiving terminal ARx and interference of signals on close receiving frequency bands between the third receiving terminal DRx and the fourth receiving terminal PRx.

As described above, according to Embodiment 3, the provision of the high frequency switch as a layered body using dielectrics makes it possible to contribute to formation of a small and low-profile device. Moreover, since the thin strip lines are used as inductors connected to common control power terminals, the configuration can be realized with a small area and interference with other elements can be prevented. Also, the input/output terminals of the high frequency switch and the ground electrode are all gathered on the back of the layered body through the via holes. Thus, a mounting area can be small when the switch is mounted on the main substrate of electronic equipment.

The above explanation described that the paths are switched by using the diodes. The paths may be switched by using other elements.

It will be understood that a high-frequency radio communication apparatus using the high frequency switch of the present invention is included in the present invention.

What is claimed is:

1. A high frequency switch having a plurality of signal paths for four frequency bands, the high frequency switch comprising:
    branching means of branching a transmission signal and a reception signal of the four frequency bands according to a frequency,
    first and second transmission reception changeover means of performing switching to each of the plurality of signal paths,
    a plurality of filters placed in the plurality of signal paths, and
    a plurality of control power supplies for switching on/off a plurality of diodes of the first and second transmission reception changeover means,
    wherein the first and second transmission reception changeover means are connected to the branching means,
    the first transmission reception changeover means has a one-input three-output port configuration in which a first common transmitting end for transmission signals of the first frequency band and the second frequency band, a first receiving end for a reception signal of the first frequency band, and a second receiving end for a reception signal of the second frequency band are connected as switching targets,
    the second transmission reception changeover means has a one-input three-output port configuration in which a second common transmitting end for transmission signals of the third frequency band and the fourth frequency band, a third receiving end for a reception signal of the third frequency band, and a fourth receiving end for a reception signal of the fourth frequency band are connected as switching targets, and
    wherein the first common transmitting end on the first transmission reception changeover means and the fourth receiving end on the second transmission reception changeover means are controlled by a first common control power supply.

2. The high frequency switch according to claim 1, wherein the second receiving end on the first transmission reception changeover means and the second common receiving end on the second transmission reception changeover means are controlled by a second common control power supply.

3. The high frequency switch according to claim 2, wherein the first transmission reception changeover means includes a first diode having an anode connected to the first common transmitting end and a cathode connected to the branching means,
    the second transmission reception changeover means includes a second diode having an anode connected to the fourth receiving end and a cathode connected to the branching means,
    a first inductor is connected to the anode of the first diode and a second inductor is connected to the anode of the second diode, and
    the first and second inductors are grounded via a first capacitor and are connected to a first common control terminal for the first common control power supply.

4. The high frequency switch according to claim 3, wherein the second transmission reception changeover means includes a third diode having an anode connected to the second common transmitting end and a cathode connected to the branching means,
    the first transmission reception changeover means includes a fourth diode having an anode connected to the second receiving end and a cathode connected to the branching means,
    a third inductor is connected to the anode of the third diode and a fourth inductor is connected to the anode of the fourth diode, and
    the third and fourth inductors are grounded via a second capacitor and are connected to a second common control terminal for the second common control power supply.

5. The high frequency switch according to claim 4, wherein a plurality of strip lines and a plurality of capacitors are formed as electrode patterns on a plurality of dielectric layers, the strip lines and capacitors constituting the first and second transmission reception changeover means, the plurality of filters, and the branching means,
    via hole conductors are formed between the dielectric layers to form the plurality of strip lines and the plurality of capacitors, and
    at least one of a diode, capacitor, resistor, and inductor constituting the first and second transmission reception changeover means, the plurality of filters, and the branching means is placed on a layered body formed by laminating the dielectric layers.

6. The high frequency switch according to claim 5, wherein a first ground electrode pattern is placed in the layered body,
    the first inductor is constituted by a first strip line, and the second inductor is constituted by a second strip line, and
    the first ground electrode pattern is placed so that the first strip line and the second strip line sandwich the first ground electrode pattern along a laminating direction of the layered body.

7. The high frequency switch according to claim 6, wherein a second ground electrode pattern is placed in the layered body, the third inductor is constituted by a third stripline, and the fourth inductor is constituted by a fourth strip line, and the second ground electrode pattern is placed so that the third strip line and the fourth strip line sandwich the second ground electrode pattern along the laminating direction of the layered body.

8. The high frequency switch according to claim 7, wherein the first ground electrode pattern and the second ground electrode pattern placed in the layered body are identical.

9. The high frequency switch according to claim 4, wherein a first strip line constituting the first inductor and a second strip line constituting the second inductor are placed so as not to overlap each other along the laminating direction.

10. The high frequency switch according to claim 4, wherein a third strip line constituting the third inductor and a fourth strip line constituting the fourth inductor are placed so as not to overlap each other along the laminating direction.

11. The high frequency switch according to claim 7, wherein the first strip line, the second strip line, the third strip line, and the fourth strip line are smaller in electrode width than strip lines other than the first strip line, the second strip line, the third strip line, and the fourth strip line.

12. The high frequency switch according to claim 6, wherein a bottom of the layered body comprises:
a first transmitting terminal electrode connected to the first common transmitting end,
a second transmitting terminal electrode connected to the second common transmitting end,
a first receiving terminal electrode, a second receiving terminal electrode, a third receiving terminal electrode, and a fourth receiving terminal electrode respectively connected to the first receiving end, the second receiving end, the third receiving end, and the fourth receiving end,
first and second control terminal electrodes respectively connected to the first and second control terminals, and
a plurality of ground terminal electrodes electrically connected to the first ground electrode pattern, and
the first control terminal electrode is placed between the first transmitting terminal electrode and the fourth receiving terminal electrode.

13. The high frequency switch according to claim 12, wherein the second control terminal electrode is placed between the second transmitting terminal electrode and the second receiving terminal electrode.

14. The high frequency switch according to claim 12, wherein at least one of the plurality of ground terminal electrodes is placed between the first receiving terminal electrode and the second receiving terminal electrode.

15. The high frequency switch according to claim 12, wherein at least one of the plurality of ground terminal electrodes is placed between the third receiving terminal electrode and the fourth receiving terminal electrode.

16. A high-frequency radio communication apparatus, comprising:
the high frequency switch according claim 1,
a receiving device which is connected to the high frequency switch and processes a reception signal, and
a transmitter which is connected to the high frequency switch and generates a transmission signal.

17. A high frequency switch, comprising:
branching means of branching reception signals and transmission signals into reception signals and transmission signals having lower frequencies than a predetermined frequency and reception signals and transmission signals having higher frequencies than the predetermined frequency,
first transmission reception changeover means of switching a transmitting path and a receiving path, the transmitting path transmitting transmission signals from all or some of a plurality of frequency bands having lower frequencies than the predetermined frequency, the receiving path transmitting reception signals according to frequencies of the plurality of frequency bands having lower frequencies than the predetermined frequency,
second transmission reception changeover means of switching a transmitting path and a receiving path, the transmitting path transmitting transmission signals from all or some of at least one frequency band having a higher frequency than the predetermined frequency, the receiving path transmitting a reception signal according to a frequency of at least one frequency band having a higher frequency than the predetermined frequency, and
a common control terminal of performing control such that one of the transmitting path and the receiving path serving as switching targets of the first transmission reception changeover means and one of the transmitting path and the receiving path serving as switching targets of the second transmission reception changeover means are simultaneously connected to the branching means,
wherein relationship of transmission and reception is reversed regarding one of the paths of the first transmission reception changeover means and one of the paths of the second transmission reception changeover means, the paths being connected simultaneously.

18. The high frequency switch according to claim 17, wherein the common control terminal comprises:
a first common control terminal of performing control such that a transmitting path and a receiving path are simultaneously connected to the branching means, the transmitting path transmitting a transmission signal of the first transmission reception changeover means, the receiving path transmitting a reception signal of the second transmission reception changeover means, and
a second common control terminal of performing control such that a transmitting path and a receiving path are simultaneously connected to the branching means, the transmitting path transmitting a transmission signal of the second transmission reception changeover means, the receiving path transmitting a reception signal of the first transmission reception changeover means.

19. A high-frequency radio communication apparatus, comprising:
the high frequency switch according to claim 17,
a receiving device which is connected to the high frequency switch and processes a reception signal, and
a transmitter which is connected to the high frequency switch and generates a transmission signal.

20. A high frequency switch, comprising:
branching means of branching reception signals and transmission signals into reception signals and transmission signals having lower frequencies than a predetermined frequency and reception signals and transmission signals having higher frequencies than the predetermined frequency,
first transmission reception changeover means of switching a transmitting path and a receiving path, the transmitting path transmitting transmission signals from all or some of at least one frequency band having a lower frequency than the predetermined frequency, the receiving path transmitting a reception signal according to a frequency of at least one frequency band having a lower frequency than the predetermined frequency, second transmission reception changeover means of switching a transmitting path and a receiving path, the transmitting path transmitting transmission signals from all or some of a plurality of frequency bands having higher frequencies than the predetermined frequency, the receiving path transmitting reception signals according to frequencies of the plurality of frequency bands having higher frequencies than the predetermined frequency, and a common control terminal of performing control such that one of the transmitting path and the receiving path serving as switching targets of the first transmission reception changeover means and one of the transmitting path and the receiving path serving as switching targets of the second transmission reception changeover means are simultaneously connected to the branching means, wherein relationship of transmission and reception is reversed regarding one of the paths of the first transmission reception changeover means and one of the paths of the second transmission reception changeover means, the paths being connected simultaneously.

21. The high frequency switch according to claim 20, wherein the common control terminal comprises:

a first common control terminal of performing control such that a transmitting path and a receiving path are simultaneously connected to the branching means, the transmitting path transmitting a transmission signal of the first transmission reception changeover means, the receiving path transmitting a reception signal of the second transmission reception changeover means, and a second common control terminal of performing control such that a transmitting path and a receiving path are simultaneously connected to the branching means, the transmitting path transmitting a transmission signal of the second transmission reception changeover means, the receiving path transmitting a reception signal of the first transmission reception changeover means.

22. A high-frequency radio communication apparatus, comprising:

the high frequency switch according to claim 20, a receiving device which is connected to the high frequency switch and processes a reception signal, and a transmitter which is connected to the high frequency switch and generates a transmission signal.

* * * * *